United States Patent [19]

Lovato

[11] Patent Number: 4,854,729
[45] Date of Patent: Aug. 8, 1989

[54] TEMPERATURE DETECTING APPARATUS FOR PIPES IN REFINERY FURNACES AND THE LIKE

[75] Inventor: Vittorio Lovato, Voghera, Italy
[73] Assignee: AGIP Petroli S.P.A., Rome, Italy
[21] Appl. No.: 189,613
[22] Filed: May 3, 1988
[30] Foreign Application Priority Data Aug. 31, 1987 [IT] Italy .................. 21758 A/87

[51] Int. Cl.⁴ .................. G01K 1/14; G01K 7/04
[52] U.S. Cl. .................. 374/141; 136/230; 374/147; 374/179
[58] Field of Search .......... 374/179, 148, 147, 208, 374/141; 136/230, 233

[56] References Cited

U.S. PATENT DOCUMENTS

| | | | |
|---|---|---|---|
| 2,838,935 | 6/1958 | Di Cecio et al. | 374/208 |
| 2,967,429 | 1/1961 | Taylor | 374/179 X |
| 3,444,740 | 5/1969 | Davis | 136/230 X |
| 3,901,080 | 8/1975 | Hillborn | 374/147 |
| 4,132,114 | 1/1979 | Shah et al. | 374/179 |
| 4,187,434 | 2/1980 | Pater, Jr. | 374/148 X |

Primary Examiner—Daniel M. Yasich
Attorney, Agent, or Firm—Laff, Whitesel, Conte & Saret

[57] ABSTRACT

A temperature detecting apparatus for pipes in refinery furnaces and the like comprises a thermocouple (2) which is supported in cantilevered fashion in the region of its detection end (2b) fastened to the outer surface of a pipe (5) which is located inside a furnace. The thermocouple is provided with a rod (2a) coming out of the furnace through an opening (3) formed in the furnace wall (4). Coaxial with the rod (2a) is a tubular protection element (10) which is secured along the rod, slidably and loosely passes through the opening (3) and extends as far as close to the pipe (5). Formed between the rod (2a) and tubular element (10) is an air space (2) through which air is sucked from the outside to the inside of the furnace by effect of the slight vacuum created in the furnace to cool the rod in order to prevent the thermocouple from being overheated due to the high temperature present in the furnace.

3 Claims, 1 Drawing Sheet

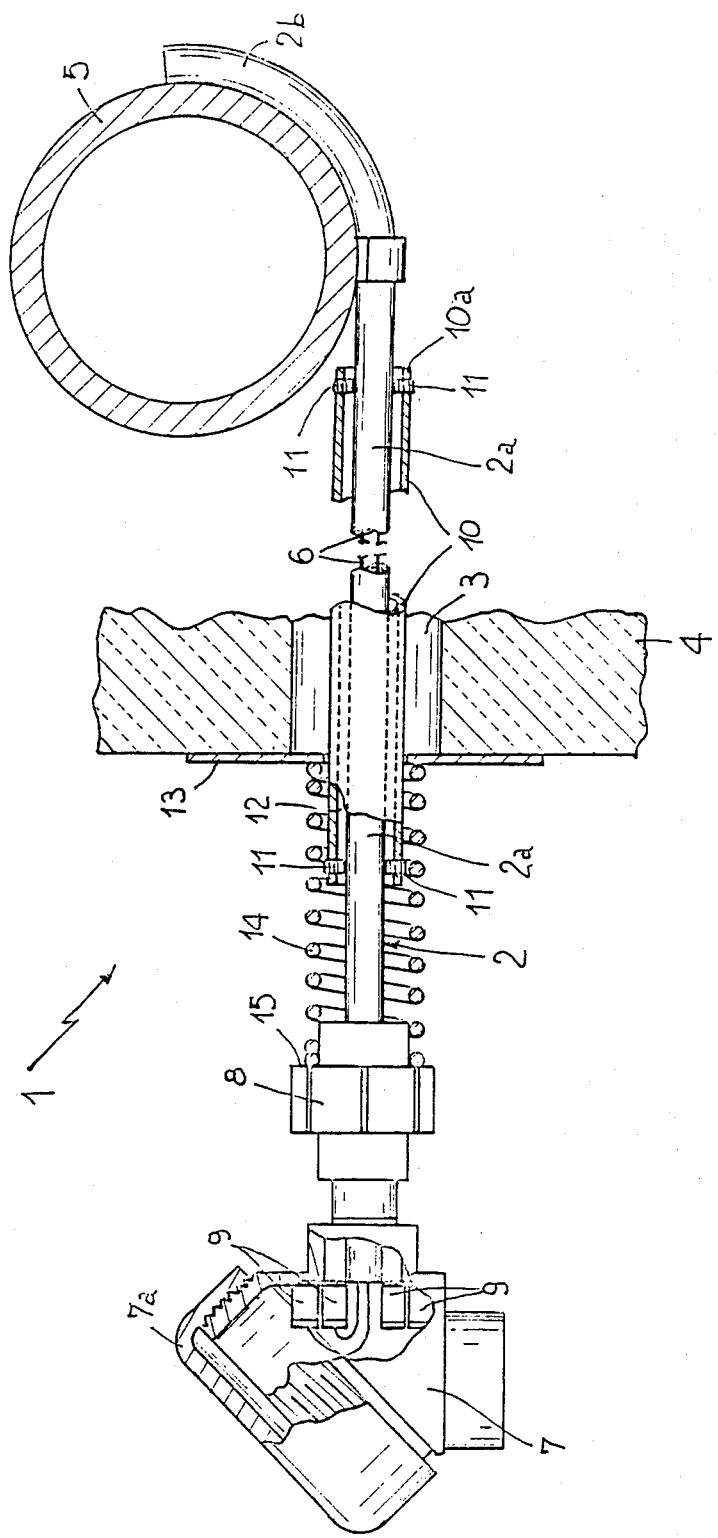

TEMPERATURE DETECTING APPARATUS FOR PIPES IN REFINERY FURNACES AND THE LIKE

FIELD OF THE INVENTION

The present invention relates to an apparatus to detect the pipe temperature in refinery furnaces and the like, of the type comprising a thermocouple provided with one rod passing through one wall of the furnace and terminating in a detection end fastened to the surface of a pipe located inside the furnace.

In greater detail the apparatus in reference is useful in refinery furnaces which are for example used to vaporize crude oil or in petrol reforming processes and working processes applied to crude oil and products derived therefrom.

PRIOR ART

It is known that in refinery furnaces it is very important to constantly check the operation temperature of the pipes through which the fluid being processed is circulated. In fact, since very high temperatures are reached in the furnace, it is necessary to be always sure that the maximum pipe temperature does not exceed the safety limit values. Beyond said limit values undesired chemical resolutions of the product being processed could take place, as well as a dangerous lowering in the mechanical strength of the pipes.

The above mentioned check is presently carried out by a number of thermocouples distributed along the pipes. In short, each of said thermocouples consists of a tubular metal rod housing suitable wires which are connected to a detection end exhibited by the rod and fixedly fastened to the outer surface of the corresponding pipe. On the side opposite the detection end, the rod comes out of the furnace through one wall thereof, to which wall the rod is rigidly secured.

The thermocouples presently used are subjected to frequent failures and breaks due to different concomitant factors. One of these factors is that thermocouples are directly exposed to high temperatures which can easily cause the burnout of the wires passing through the rod even when the rod is filled with suitable insulating materials.

In addition, since thermocouples are rigidly engaged in the region of their opposite ends, they can easily break when they are submitted to high mechanical stresses as a result of the thermal expansions they undergo due to the high temperature of the furnace. In fact the thermal expansion of pipes gives rise to the expansion of the respective thermocouples because the detection ends of the thermocouples tend to be moved with respect to their attachment points to the furnace walls.

In order to reduce the effects resulting from the thermal expansion of pipes and thermocouples, the rod of each thermocouple is presently shaped in such a manner that along its extension one or more coils are formed which can elastically deform as a result of said thermal expansions. However this solution does not ensure an optimal resistance of the thermocouples to mechanical stresses. Furthermore thermocouples are also submitted to chemical attacks by different corrosive substances present in the burnt gas passing through the furnace. As time goes by, these substances wear the thermocouple rods and reduce their mechanical strength to such a point that they break by effect of said mechanical stresses.

SUMMARY OF THE INVENTION

It is therefore an object of the present invention to solve the problems of known art by an apparatus arranged in such a manner that a corresponding thermocouple adapted to detect the pipe temperature is submitted neither to high temperatures or to mechanical stresses nor to the action of chemical agents.

The fogregoing and still further objects that will become more apparent in the course of the following description, are substantially attained by a temperature detecting apparatus for pipes in refinery furnaces and the like, wherein the thermocouple rod is slidably and loosely engaged through an opening formed in the furnace wall and is provided with a tubular protection element which extends coaxially with and along the rod, crosses said opening and has one end in the vicinity of said pipe, the inner diameter of said tubular element being slightly bigger than the maximum rod diameter, in order to create an air space between the tubular element and the rod through which air can be sucked from the outside to the inside of the furnace by effect of the vacuum created in the furnace itself.

BRIEF DESCRIPTION OF THE DRAWING

Further features and advantages will best be understood from the detailed description of a preferred embodiment of a temperature detecting apparatus for pipes in refinery furnaces and the like in accordance with the present invention, given hereinafter by way of non-limiting example with reference to the accompanying drawing in which the only figure shows a broken cross-sectional view of the apparatus of the invention in its use condition.

DESCRIPTION OF THE PREFERRED EMBODIMENT

With reference to the figure, the temperature detecting apparatus for pipes in refinery furnaces and the like in accordance with the invention has been globally identified by reference numeral 1. The apparatus 1 comprises a thermocouple 2 provided with a substantially rectilinear rod 2a slidably and loosely passing through an opening 3 formed in a wall 4 of a refinery furnace not shown. In the interior of the furnace the rod 2a terminates in a detection end 2b which is curved and fastened, preferably by welding, to an outer surface of a pipe 5 extending within the furnace and designed to be passed through by a fluid product being processed.

In known manner, the rod 2a of the thermocouple 2 has a tubular structure and is crossed by wires 6 terminating at the detection end 2b where they are disposed in contact relation with the pipe surface.

The thermocouple 2 is advantageously supported in cantilevered fashion by pipe 5 adjacent the detection end 2b and is conventionally provided with a junction head 7 fastened to the end of the rod 2a opposite the detection end 2b by means of a joint 8 of known type, so that it is located at the exterior of the furnace. Terminals 9 to which the wires 6 are connected, are housed in head 7. Said terminals which are accessible after removing a screw threaded plug 7a, allow the electrical connection of the thermocouple 2 to conventional indication equipments, known per se, which are capable of signalling the temperature detected by the thermocouple in the region of its end 2b.

In an original manner the apparatus 1 further comprises a tubular protection element 10 extending coaxially with and along the rod 2a and secured thereto by means of set screws or the like 11 located at the opposed ends of the tubular element. The tubular element 10 slidably and loosely passes through the opening 3 and extends towards the inside of the furnace so that one end 10a thereof can come close to pipe 5 and thus almost completely cover the outer portion of rod 2a extending in the interior of the furnace.

As clearly seen in the figure, it is also advantageously provided that the tubular element 10 should have an inner diameter slightly bigger than the maximum diameter of the rod 2a. In this way an air space 12 can be created between the rod 2a and tubular element 10. During the furnace operation air is sucked through said air space from the surrounding atmosphere to the interior of the furnace by effect of the slight vacuum conventionally created in the furnace. The air passing through the air space (12) carries out the cooling of the rod (2a) in order to prevent the thermocouple (2) from being overheated due to the high temperature present in the furnace.

In order to avoid the intake of air through the opening too, a closure disk 13 is slidably engaged along the tubular element 10, the maximum diameter of said disk being bigger than the diameter of opening 3. The disk 13 is preferably located outside the furnace and is urged against the wall 4 by the action of a spring 14 located in a coaxial relation with the rod 2a and acting between a locating abutment 15 integral to the rod and the disk. In the embodiment shown the locating abutment 15 is formed by joint 8.

As regards the detection of the pipe temperature by thermocouple 2, the operation of apparatus 1 is substantially identical to that of known apparatuses and therefore does not need particular explanations.

Advantgeously, during the normal operation of the furnace the air passing through the air space 12 carries out the cooling of the rod 2a in order to avoid the thermocouple 2 being overheated due to the high temperature present in the furnace. The detection end 2b which is not protected by the tubular element 10, takes the surface temperature of pipe 5 which is always lower than the temperature in the combustion chamber. The presence of the tubular element 10 also protects the rod 2a from the attack of corrosive substances present in the burnt gas passing through the furnace. In this connection it is to be noted that the detection end 2b can be protected from said corrosive substances by means of known and conventional protection elements adapted to be fastened to the pipe surface.

As the thermocouple 2 is supported in cantilevered fashion by pipe 5, it can undergo even important thermal expansions without stresses being produced thereon. In fact, a thermal expansion of thermocouple 2 merely gives rise to the spacing apart of head 7 from the wall 4. Due to the action of spring 14, the disk 13 is held against the wall 4 even when the rod 2a and tubular element 10 move apart with respect to said wall as a result of the above mentioned thermal expansions.

Since the tubular element 10 is slidably and loosely engaged in the opening 3, the thermocouple 2 is not submitted to any mechanical stress even if pipe 5 undergoes thermal expansions. The thermocouple 2 is in fact capable of following the pipe-length variations because it can move freely in a transverse direction within the opening 3, together with the tubular element 10.

The present invention attains the intended purposes. In fact, as previously set forth, the solutions adopted in the apparatus of the invention can eliminate all stresses in the thermocouple 2 when they originate either from high temperatures or chemical substance attacks and even when mechanical stresses as a result of thermal expansions are present. All problems of known art connected with the frequent breakings of thermocouples are thus eliminated. It is obviously understood that the present invention is susceptible of many modifications and variations all falling within the scope of the inventive idea characterizing it.

What is claimed is:

1. A temperature detecting apparatus for pipes in refinery surfaces and the like of the type comprising a thermocouple (2) provided with a thermocouple rod with a sensing end and (2a) passing through one wall (4) of a furnace and terminating in a detection end (2b) fastened to the surface of a pipe (5) located inside the furnace, wherein the thermocouple rod (2a) is freely arranged through an opening (3) formed in said wall (4) and is outerly provided with a tubular protection element (10) which extends coaxially with and along said rod (2a), crosses said opening (3) and has one end (10a) in the vicinity of said pipe (5), the inner diameter of said tubular element (10) being slightly bigger than the maximum diameter of said rod (2a) in order to create an air space (12) between the tubular element and the rod through which cooling air is capable of being drawn into said furnace and is passed throughout.

2. An apparatus according to claim 1, wherein said tubular element (10) is fixedly engaged to the thermocouple rod (2a) and loosely crosses said opening (3) said tubular element being slidably engaged in a closure disk (13) which is urged against the furnace wall (4) by the action of a spring (14) coaxial with said rod and acting between said disk (13) and a locating abutment (15) which is fixed with respect to said rod (2a).

3. An apparatus according to claim 1, wherein said thermocouple (2) is supported in cantilevered fashion by said pipe (5).

* * * * *